Nov. 25, 1969  A. M. HARDISON  3,480,451
APPARATUS FOR PROCESSING LIQUID FOOD PRODUCTS
Filed Jan. 8, 1965  6 Sheets-Sheet 1

INVENTOR:
ADAM M. HARDISON

BY Parrott, Bell, Seltzer, Park & Heard
ATTORNEYS

Nov. 25, 1969  A. M. HARDISON  3,480,451
APPARATUS FOR PROCESSING LIQUID FOOD PRODUCTS
Filed Jan. 8, 1965  6 Sheets-Sheet 3

INVENTOR:
ADAM M. HARDISON

BY Parrott, Bell, Seltzer, Park & Heard
ATTORNEYS

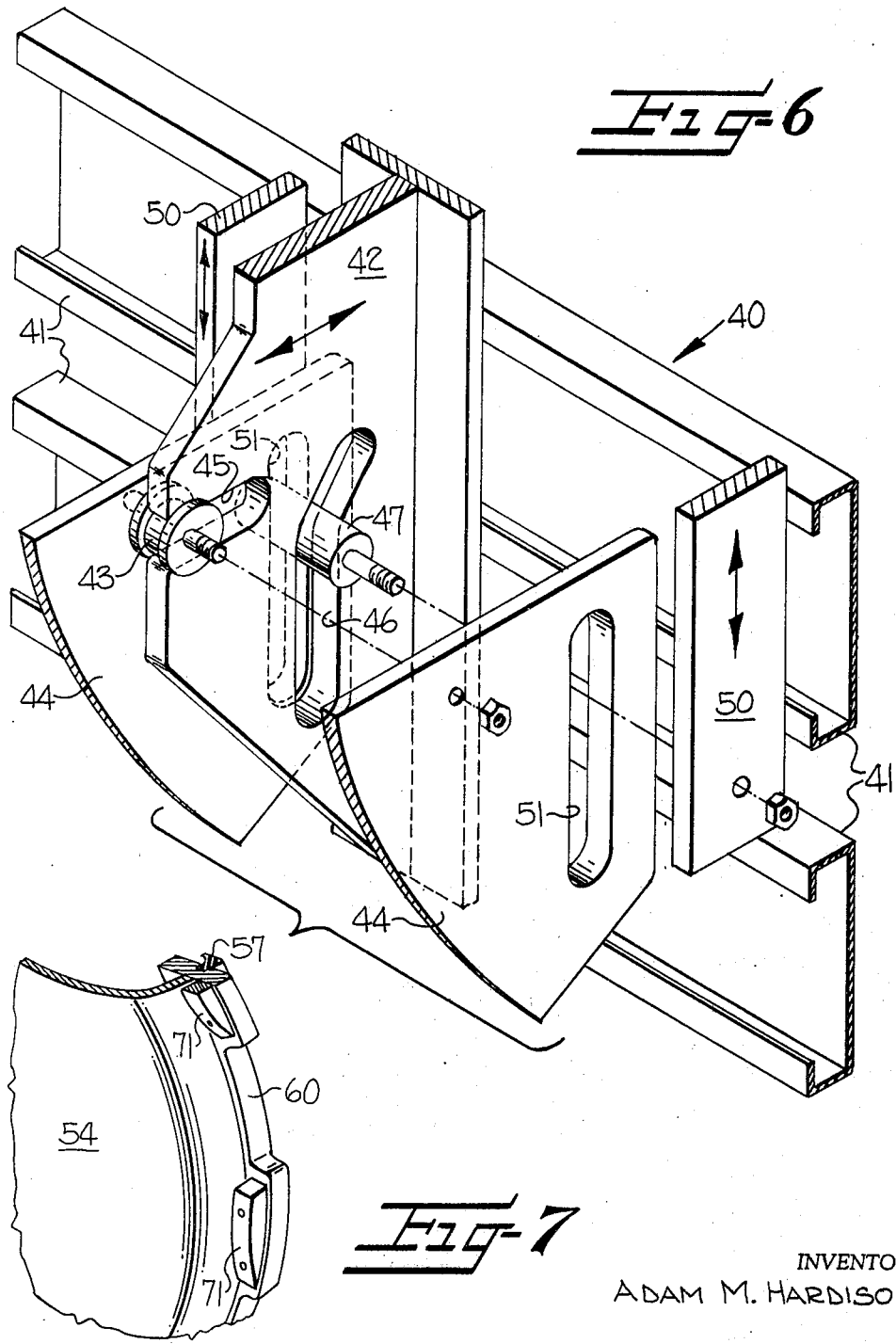

INVENTOR:
ADAM M. HARDISON

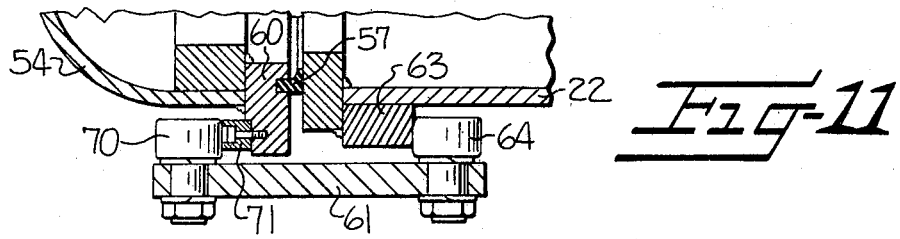
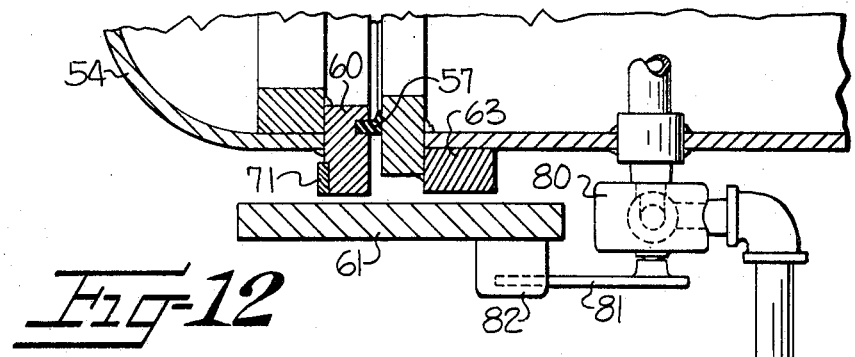
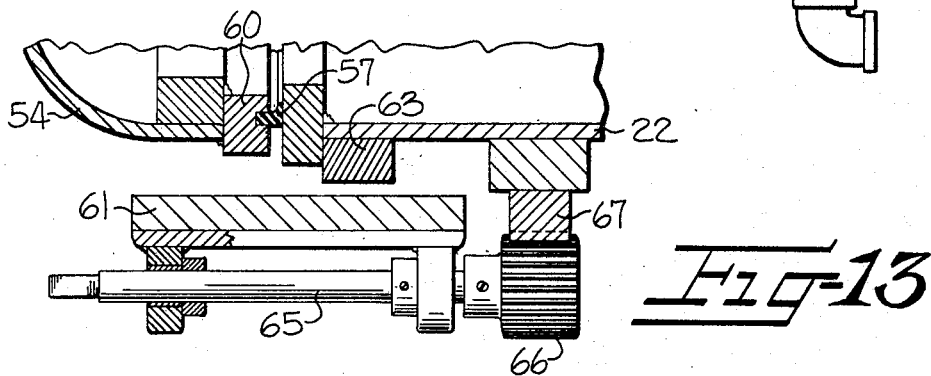
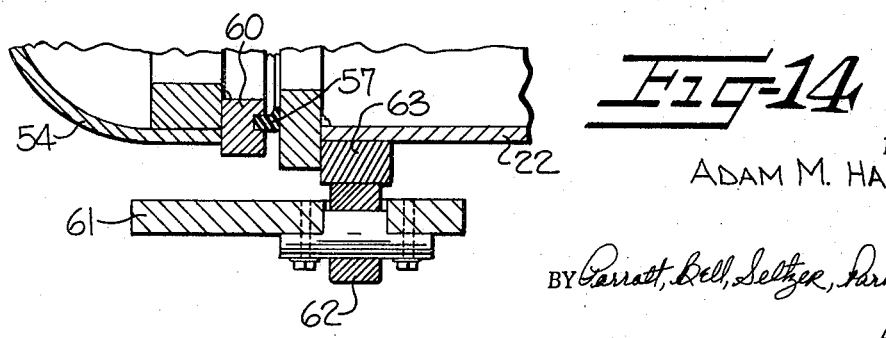

United States Patent Office 3,480,451
Patented Nov. 25, 1969

1

3,480,451
APPARATUS FOR PROCESSING LIQUID
FOOD PRODUCTS
Adam M. Hardison, P.O. Box 279,
Wadesboro, N.C. 28170
Filed Jan. 8, 1965, Ser. No. 424,384
Int. Cl. A23l 3/10
U.S. Cl. 99—234                                    14 Claims

ABSTRACT OF THE DISCLOSURE

Apparatus for processing liquid food products to impart improved non-refrigerated storage life without excessive loss of flavor, wherein the liquid food products are confined within an autoclave, a fluid heating medium is admitted into the autoclave and heats the food products to a pre-determined temperature while the food products are agitated to insure even and thorough heating thereof, and a fluid cooling medium at a temperature below 32° F. is admitted into the autoclave to quickly cool the liquid food products.

This invention pertains to an apparatus for processing liquid food products, and more particularly to such an apparatus useful to impart improved non-refrigerated storage life without excessive loss of flavor to such food products packaged in sealed containers, such as bottled soft drinks.

In the processing of certain packaged food products and particularly certain types of bottled soft drinks, such as chocolate milk drinks, fruit drinks and the like, heat treatment has been found to be required in order to provide adequate non-refrigerated storage or shelf life. Such heat treatment is conventionally performed in a closed chamber in which the bottled soft drinks are heated to a predetermined temperature, usually in excess of 212° F., for a predetermined time period.

Heretofore such heat treatment has had the very undesirable result of an excessive loss of flavor from the bottled soft drinks being treated. It has been discovered that this loss of flavor may be substantially reduced by relatively quickly cooling the bottled soft drinks from the predetermined temperature to which the same are heated during the heat treatment. Effective quick cooling of bottled soft drinks following a heat treatment has not been heretofore achieved within a sufficiently short time period to prevent excessive loss of flavor, separation or excessive breakage of the bottles in which the soft drinks are packaged. One commonly used attempted solution to this cooling problem consists of the immediate venting of the autoclave at the conclusion of the predetermined time period for the heat treatment, the quick removal of the bottled soft drinks from the autoclave, and the reliance on the natural heat transfer from the bottled soft drinks to the surrounding atmosphere to cool the bottled soft drinks. However, this attempted solution still requires a considerable and excessive time period and therefore results in undue separation or settling of solid particles from the solution and an excessive loss of flavor from the soft drinks within the bottles.

Further, some agitation of the bottled soft drinks has been found to be required during the aforementioned heat treatment to insure even and thorough heating of the bottled soft drinks. Conventionally, this agitation of the bottled soft drinks is accomplished by placing the bottled soft drinks in an autoclave, and by rotating the autoclave during the heat treatment of the bottled soft drinks.

While such rotatable autoclaves have provided the

2 desired agitation, problems have been encountered therewith. For example, while such conventional autoclaves have some form of sealing means, such sealing means usually require considerable time to be engaged to properly seal the autoclave and usually do not have effective safety means associated therewith. Also, excessive breakage of the bottles in which the soft drinks are packaged frequently occurs in the use of such conventional autoclaves due to the absence of an effective clamping means therefor.

It is therefore an object of the present invention to provide an improved apparatus for processing certain packaged food products and more particularly certain bottled soft drinks in which non-refrigerated storage or shelf life is imparted to the food products being processed without undue separation of solid particles from the solution or excessive loss of flavor therefrom.

A more specific object of this invention is to provide an improved apparatus for processing certain bottled soft drinks wherein the bottled soft drinks are heated to a predetermined temperature for a predetermined time period to impart non-refrigerated storage or shelf life thereto and are then quickly cooled from the predetermined temperature to prevent undue separation of solid particles from the solution or the excessive loss of flavor therefrom.

Another object of the present invention is to provide an improved apparatus for processing certain bottled soft drinks including an improved autoclave which may be quickly and completely sealed and which provides improved and effective clamping of the bottled soft drinks within the autoclave to prevent undesirable excessive breakage of the bottles.

Some of the objects of the invention having been stated, other objects will appear as the description proceeds, when taken in connection with the accompanying drawings, in which—

FIGURE 6 is an enlarged exploded detail view, in perspective, of a portion of the autoclave shown in the lower left-hand portion of FIGURE 4;

FIGURE 7 is a detail view, in perspective, of a portion of the cover member for the autoclave;

FIGURES 10–14 are fragmentary enlarged sectional plan views taken substantially along the respective lines 10—10, 11—11, 12—12, 13—13 and 14—14 in FIGURE 9.

Figure 1:
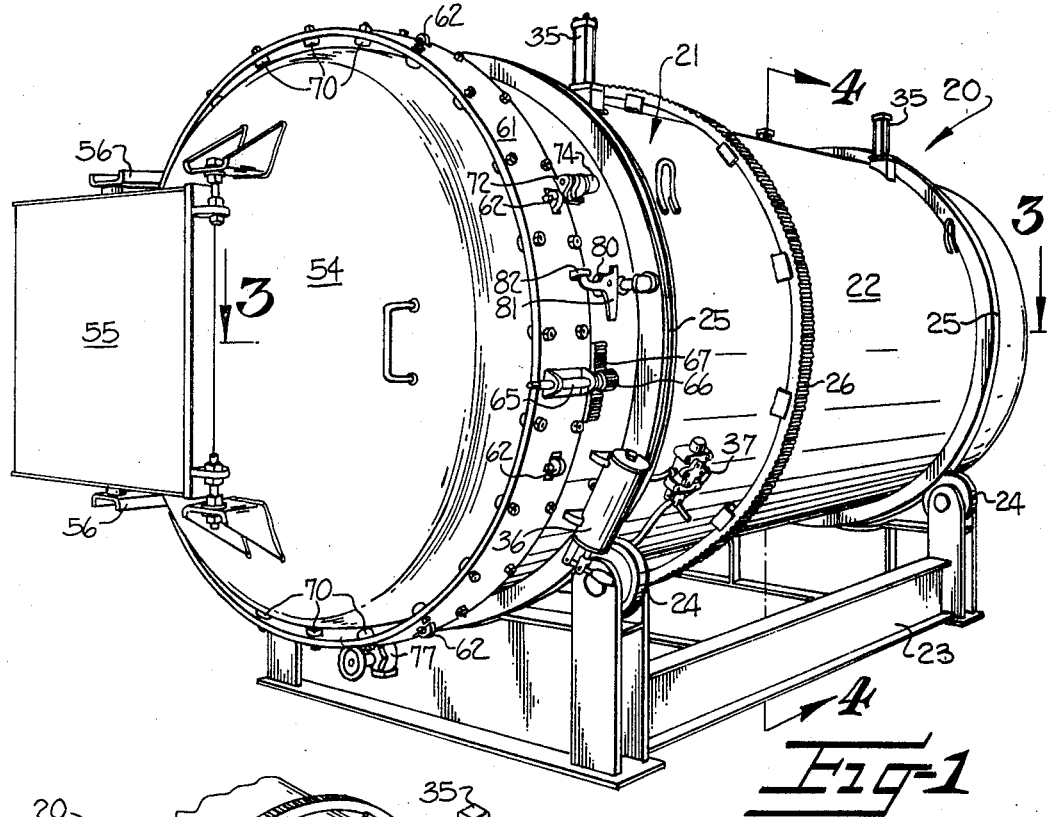
FIGURE 1 is a perspective view of an autoclave for processing bottled soft drinks in accordance with this invention, in a closed or operating condition.
Figure 2:
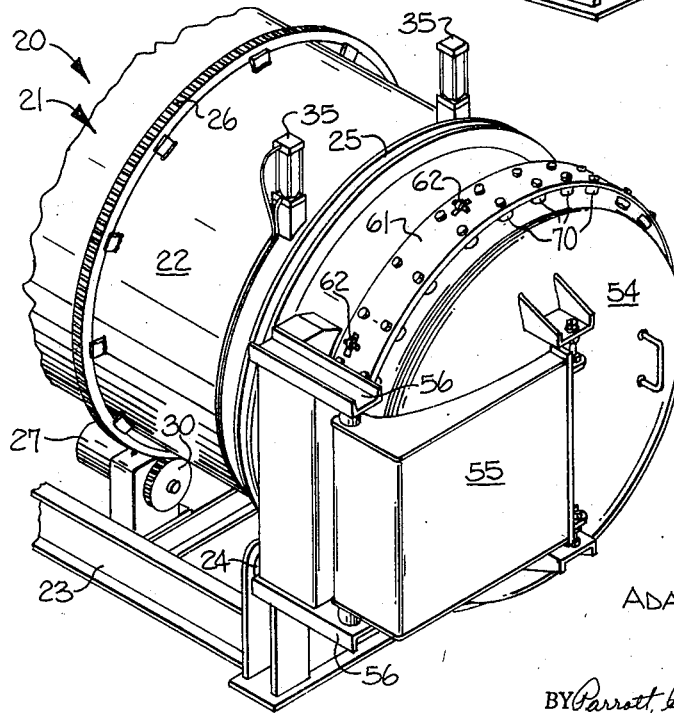
FIGURE 2 is a perspective view of a portion of the autoclave of FIGURE 1, taken from a different viewpoint.

Referring more specifically to the drawings, the apparatus of this invention is broadly indicated at 20 and includes an autoclave, broadly indicated at 21, which preferably is formed with a generally cylindrical body 22, closed at one end and open at the other end to be adapted to receive pallets of packaged food products within the body. As best shown in FIGURES 1 and 2, the body 22 is supported for rotation on a frame 23, which carries a number of roller members 24 on which the body 22 rests. The body 22 has circular track elements 25, extending around the outer circumference of the body, which engage and move on the frame roller members 24. Preferably, a ring gear 26 is secured to the body 22 and extends around the circumference of the body. A drive motor 27 is mounted on the frame 23 and drives a pinion gear 30 which is in engagement with the ring gear 26. On operation of the drive motor 27, the body 22 of the autoclave is driven in rotation on the roller members 24, for purposes to be made more clear hereinafter.

Figure 3:
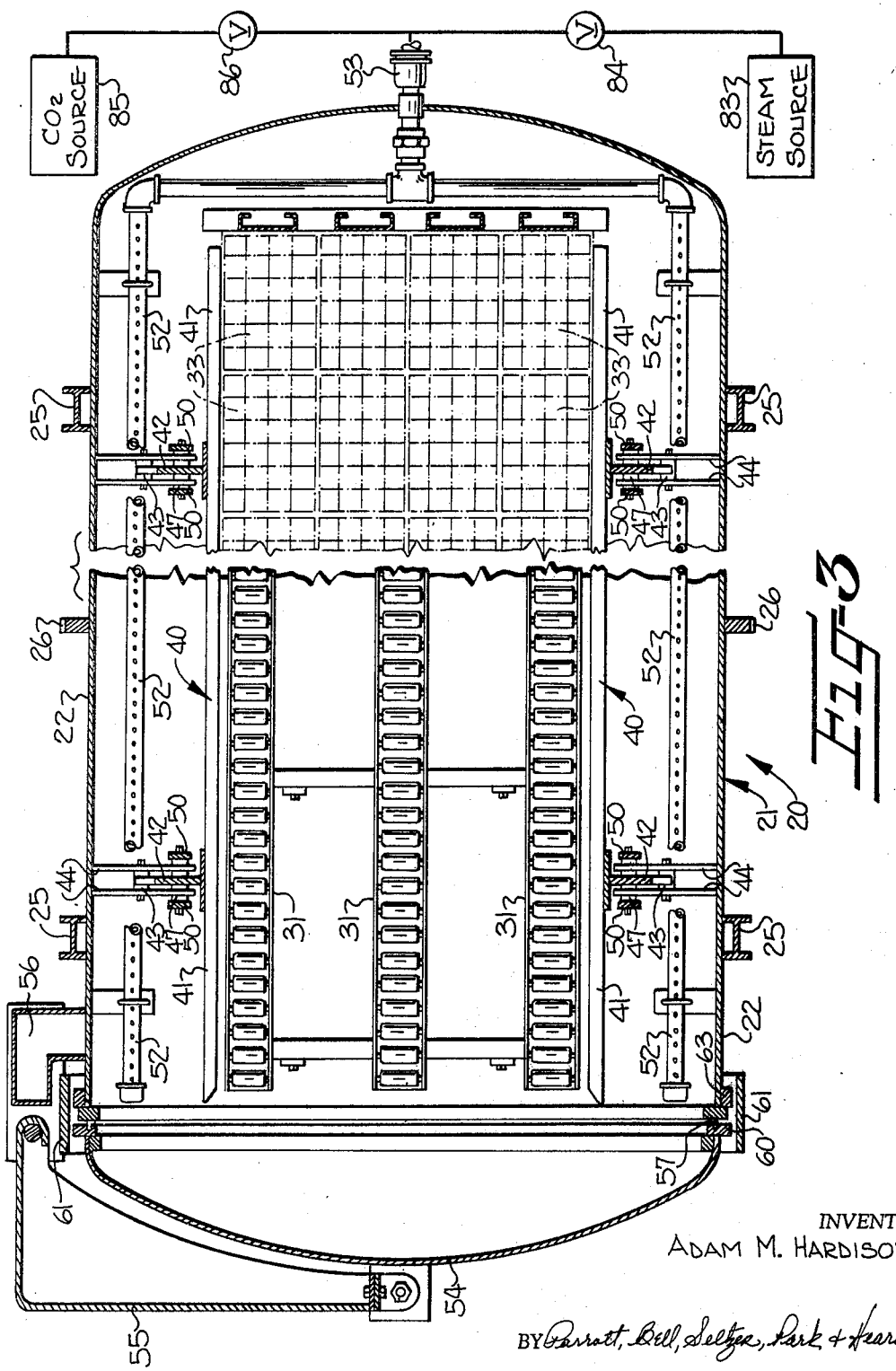
FIGURE 3 is an enlarged sectional plan view of the autoclave, taken along the lines 3—3 in FIGURE 1, and including a schematic showing of other portions of the apparatus of this invention.
Figure 4:
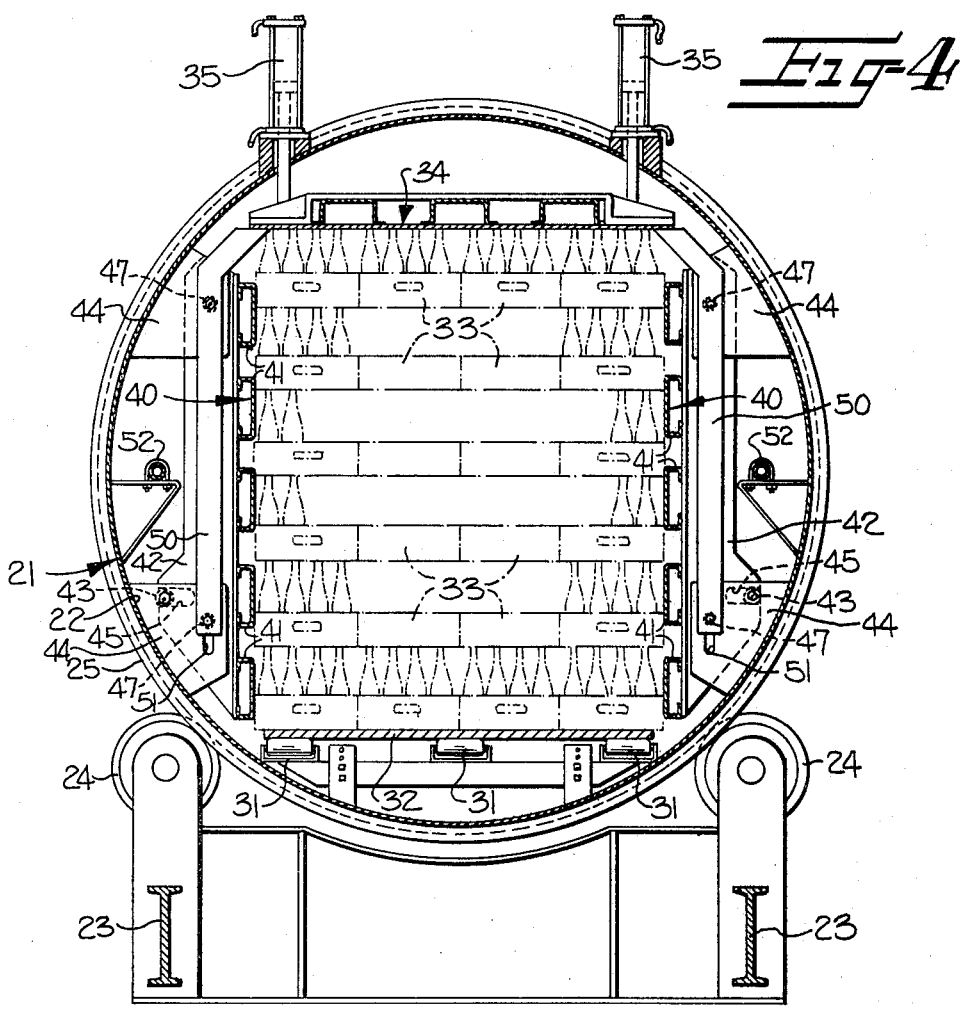
FIGURE 4 is an enlarged vertical sectional view of the autoclave, taken along the lines 4—4 in FIGURE 1.

The interior of the autoclave body 22 is provided with structure adapted to receive and secure packages of food products to be treated and to admit and distribute fluid media for the treating process, as shown more clearly in FIGURES 3–6. There, the interior of the body 22 is shown to have roller trackways 31, extending along what is the bottom of the body 22 when the autoclave is in a normal upright position, as shown in FIGURE 4. The roller trackways 31 are provided to ease the loading of pallets 32, each of which carries a number of cases 33 of bottled soft drinks, inserted through the open end of the body 22. Preferably, the roller trackways 31 are so spaced as to permit a fork lift truck to engage a pallet within the body 22 to remove the pallet or to deliver a pallet into the autoclave body 22.

In order to secure the packages of bottled soft drinks within the body 22 of the autoclave against relative movement within that body on rotation of the autoclave, this invention provides clamping means for engaging the packages of food products and clamping the packages against movement. The clamping means includes a top clamping member 34, mounted within the body 22 for vertical movement and normally overlying the cases 33 of soft drinks received within the autoclave body 22. The top clamping member 34 is moved vertically by hydraulic rams 35 mounted on the autoclave body 22 and extending through the circumferential wall of the body. Hydraulic pressure for operating the rams 35 is preferably developed by a hydraulic pump 36, carried on the autoclave body 22, and the application of the hydraulic pressure to the rams 35 is preferably controlled by a four way valve 37. Hydraulic pressure developed by the hand operated pump 36 may be applied to the rams 35 to raise or lower the top clamping member 34 within the autoclave body 22. When it is desired to secure cases 33 of soft drinks, the top clamping member 34 is moved downwardly to engage the upper surfaces of the packages of soft drinks, which as illustrated in FIGURE 4 are the capped ends of individual bottles carried in the cases 33.

Figure 5:
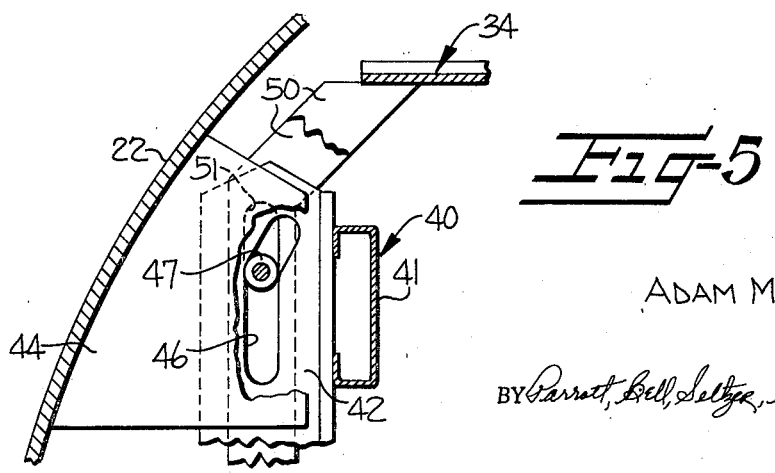
FIGURE 5 is an enlarged detail of a portion of the autoclave as shown in the upper left-hand portion of FIGURE 4.

Further, in order to avoid excessive stress on the individual bottles, the clamping means includes two side clamping members 40, supported within the autoclave body 22 for lateral movement, and means interconnecting the top clamping member 34 and side clamping members 40 to cause interrelated movement of all clamping members. The coordinated movement of the clamping members is such that, as the top clamping member 34 is moved downwardly to engage the upper surface of the packages of food products, the side clamping members 40 are moved laterally inwardly to clamp the sides of the cases 33. The cases are thus secured against any relative movement within the autoclave body 22 as the autoclave subsequently rotates. The manner in which the side clamp members 40 are supported for lateral movement and the interconnection of the clamping members to obtain coordinated movement is shown most clearly in FIGURES 5 and 6. As there shown, each side clamping member includes a number of bars 41 extending longitudinally within the body 22 and spaced vertically so as to engage the crates 33 of soft drinks positioned within the body. The bars 41 are secured to and carried by a link member 42, which is supported within the autoclave body 22 for lateral movement only, as indicated by the double headed arrow in FIGURE 6. This link member 42 is supported by a roller member 43, which is journaled in two support plates 44 welded to the inside wall of the autoclave body 22. A slot 45 in the link member 42 engages the roller member 43, to restrain the link member 42 from vertical movement while permitting lateral movement. The link member 42 additionally carries a cam means, in the form of a slot 46 which receives a roller member 47 which extends through the support plates 44 and is journaled in two vertical link members 50. These link members 50 are secured to the top clamping member 34, as shown in FIGURE 5, and are restrained to move in a vertical direction only, as indicated by the double-headed arrow in FIGURE 6, by the roller member 47 and slots 51 in the support plates 44 through which that roller 47 extends. On downward movement of the top clamping member 34, the link members 50 secured to that clamping member move downwardly, causing the roller 47 journaled on those link members to operate in the cam slot 46 and move the side clamping link member 42 laterally inwardly. In order to accommodate the packages of soft drink bottles of various sizes, as eight ounce, twelve ounce, and sixteen ounce, the cam slot 46 is given a dog leg shape which causes the side clamping means to engage the cases 33 on the initial downward movement of the top clamping member 34, while permitting further travel of the top clamping member 34 to engage cases of bottles of less height without further lateral movement of the side clamping members 40.

In order to distribute fluid media within the interior of the body 22 of the autoclave of this invention, distribution conduits 52 are supported within the body and extend longitudinally adjacent the walls of the body. The conduits 52 carry openings throughout their length, and are joined at the closed end of the body 22, where they pass through the closed end to a rotatable union connection 53, to which fluid media are supplied as will be hereinafter described to be distributed within the autoclave body to perform the treating process.

In order to seal the autoclave body 22, this invention provides a cover 54, supported from the autoclave body 22 and adapted to sealingly engage the open end of the body. The cover 54 is supported as best shown in FIGURES 2 and 3, by pivotal attachment to a hinge member 55, which in turn is pivotally attached to support members 56 fixed to the body 22. The cover 54 carries a gasket member 57, which is adapted to engage the open end of the autoclave body 22 and, on compression between the cover member 54 and body 22, seal the open end against the escape of treating media supplied to the interior of the sealed autoclave through the distribution conduits 52.

In order to assure that proper sealing of the cover 54 to the body 22 of the autoclave is obtained and maintained during the treating process, this invention provides means for drawing the cover into engagement with the body and locking the cover in that engaging relationship. This means is most clearly shown in FIGURES 7–14. As shown in those figures, the cover 54 is formed with a flange 60, at the portion of the cover which is to engage the body 22 of the autoclave, which carries the gasket 57. This flange 60 is an interrupted flange; that is, the flange is formed by a number of spaced apart segments extending around the circumference of the cover and projecting outwardly from the cover. Rotatably supported on the body 22, and rotatable relative to that body, is a locking ring member 61. The locking ring member 61 is supported on the body 22 by low friction means such as roller members 62, shown in FIGURE 14, and is restrained against movement off the open end of the body 22 by the engagement of an uninterrupted flange 63 carried on the body and additional roller members 64 carried on the locking ring member as shown in FIGURE 11. Means are provided for rotating the locking ring member 61 relative to the autoclave body 22 and cover 54, and for controlling the relative position of those elements, as shown in FIGURE 13. There, the locking member 61 is shown to carry a rotatably supported drive shaft 65 which in turn carries a locking pinion gear 66 which meshes with a locking rack 67 fixed to the body 22 of the autoclave. The drive shaft 65 may be rotated by any suitable means, such as a wrench, to cause the engagement of the pinion and rack 66, 67 to cause movement of the locking ring member 61 relative to the body 22 and cover member 54 of the autoclave.

Further, the locking ring member 61 carries a number of spaced apart roller elements 70, which are so positioned that with the locking ring member 61 at one extreme of the range of movement permitted by the engagement of the pinion and drive rack 66, 67, the roller elements 70 pass through the areas of the interrupted flange 60 where there are no protrusions. Then, on subsequent rotation of the locking ring member 61 relative to the body 22 of the autoclave, the roller elements 70 pass over and engage the protruding segments of the interrupted flange 60, to preclude the retraction of the cover member 54 from the body with the elements in this position. Further, as best shown in FIGURES 7-9 and 11, the interrupted flange 60 includes, on the protruding segments, cam elements 71, secured to the segments of the flange 60. The cam elements 71, as most clearly shown in FIGURE 9, have tapered surfaces which together define portions of an interrupted thread. Thus, in similarity to the breach-blocks or plugs employed in artillery weapons, the rotation of the locking ring member 61 relative to the stationary cam surfaces carried on the cover member 54 draws the cover member into engagement with the body 22 of the autoclave.

Figure 10:
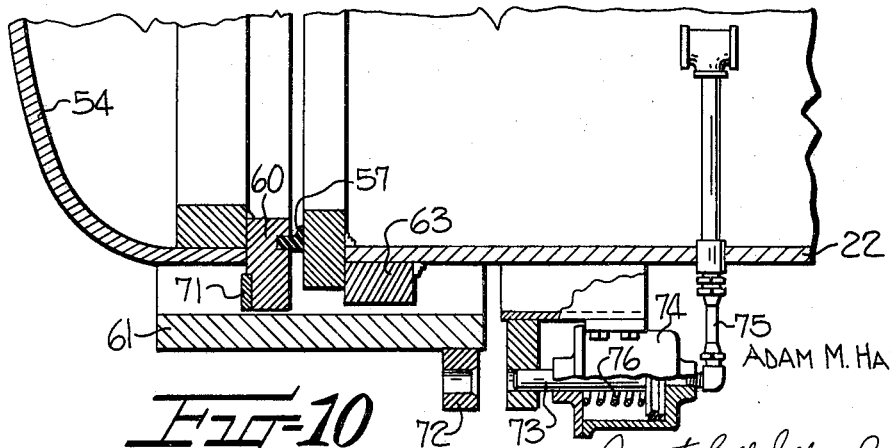

In order to prevent accidental movement of the locking ring member 61 while the autoclave is under pressure during processing, with the accompanying dangers of a violent opening of the cover member 54 and sudden dispersal of the treating fluids, this invention provides a safety lock means for positively preventing rotation of the locking ring member 61 under certain conditions. This safety locking means is best shown in FIGURE 10, where the locking ring member 61 is shown to carry a socket 72 which is alined with and may be engaged by a piston 73 when the locking ring member 61 is so positioned as to draw the cover member 54 into sealing engagement with the body 22. The piston 73 extends within a cylinder 74 which communicates, by way of a conduit 75, with the interior of the autoclave body 22. On occurrence of a pressure condition within the autoclave body 22, that pressure is applied through the conduit 75 to the piston 73 within the cylinder 74, moving the piston to the left as viewed in FIGURE 10 and causing the piston to enter into the socket 72 and lock the locking ring 61 against any rotational movement until such time as the pressure within the autoclave body 22 again drops to a level sufficiently low for a spring 76 within the cylinder 74 to withdraw the piston 73 from this socket 72.

Figure 8:
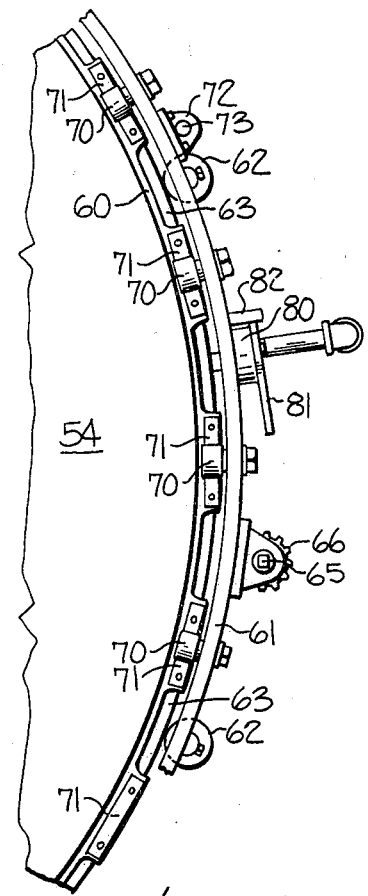
FIGURE 8 is an enlarged end view, in detail, or a portion of the cover of the autoclave shown in FIGURE 1.
Figure 9:
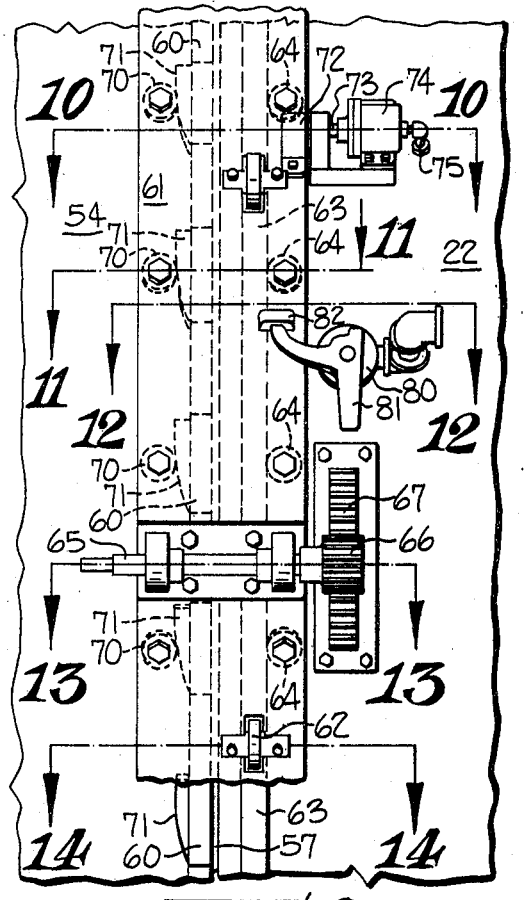
FIGURE 9 is a side view, in detail, of the structure shown in FIGURE 8.

In order to assure that the cover member 54 may safely be opened at the conclusion of the processing of soft drinks in the autoclave, without violently swinging open or explosive dispersal of fluid treating media, this invention provides vent means to vent the interior of the autoclave body. The primary venting means is under manual control, and may be such as a vent valve 77, communicating with the interior of the sealed autoclave, which may be opened by hand to vent the autoclave. As a safety precaution, and in order to entirely assure that the interior of the autoclave has been vented, a safety venting means is provided as best shown in FIGURES 8, 9 and 12. There, a safety vent valve 80 is shown to be mounted on the body 22 of the autoclave and to communicate, by conduits, with the interior of the body. The stem of the valve 80 carries an operating lever 81, which controls the position of the valve member within the valve 80 and thus the operative communication of the interior of the autoclave body with the atmosphere. As shown in FIGURE 9, one arm of the operating lever 81 extends over the locking ring member 61 when the valve is in a closed position. This arm of the operating lever 81 is engaged, on rotation of the locking ring member 61, by a projection 82 carried on the locking ring member, to turn the operating lever 81 and open the valve 80 to positively assure that the interior of the autoclave is vented before the cover member 54 is removed.

As shown in FIGURE 3, the rotary union 53 and distributing conduits 52 within the body 22 of the autoclave are operatively connected to sources of fluid treatment media, which are employed to treat packages of products which are positioned within the body 22 of the autoclave. In accordance with this invention, means are provided for supplying a fluid heating medium from any suitable source 83 of such a medium. The fluid heating medium is preferably steam, derived from a boiler or other steam generator. Admission of the fluid heating medium from the source 83 is preferably controlled by a suitable valve means 84. Additionally, the union 53 and the distributing conduits 52 are operatively connected to a suitable source 85 of a fluid cooling medium which is capable of being delivered to the autoclave at a temperature below 32° F. This fluid cooling medium may be any refrigerant gas, but preferably is carbon dioxide, which is generally economically available in a soft drink bottling plant at pressures and temperatures which permit the gas to be cooled by expansion on delivery to the autoclave. Admission of the fluid cooling medium, or refrigerant gas, is controlled by a suitable valve means 86.

In practicing the method comprehended by this invention, packages of liquid food products, such as crates of soft drinks, are positioned within the autoclave body 22 and secured against relative movement within the autoclave body by the operation of the clamping means 34, 40. The autoclave cover 54 is then drawn into sealing engagement with the autoclave body 22 and locked into sealing engagement, by means of the locking ring member 61 and intermittent flange 60 construction discussed in detail above. Fluid heating medium from the source 83 is then admitted into the sealed autoclave and distributed by the distribution conduits 52, to begin heating of the food products. While heating takes place, the drive motor 27 is operated to cause the autoclave to rotate on the support rollers 24, and agitate the food products to assure even and thorough heating of those products. Heating and agitating of the food products is continued until such time as the products reach the temperature required to impart the desired improved non-refrigerated storage life, which temperature may vary with the particular drink being processed but is usually in excess of 212° F. and may be approximately 240° F. On completion of the required heating, when the products have reached the required temperature, admission of the fluid heating medium is terminated by closing the valve means 84 controlling that medium, and admission of the fluid cooling medium is begun by opening the valve means 86 controlling that medium, which is then admitted into the autoclave through the distribution conduits 52 to cool the products quickly from the relatively high heating temperature and thus prevent excessive loss of flavor. While the rate and degree of cooling required will vary with the particular drink being processed, and will require experimental determination, satisfactory results have been obtained with certain drinks when the products were cooled to a temperature less than 130° over a time span of 15 minutes. This relatively quick cooling is a critical step in minimizing loss of flavor, while attaining the desired extended storage life characteristics, and additionally quickly frees the autoclave for processing a successive batch of products.

In the drawings and specification there has been set forth a preferred embodiment of the invention and, although specific terms are employed, they are used in a generic and descriptive sense only and not for purposes of limitation, the scope of the invention being defined in the claims.

I claim:

1. An apparatus for processing liquid food products packaged in sealed containers to impart improved non-refrigerated storage life without excessive loss of flavor, the apparatus comprising:
an autoclave including a hollow body open at one end and adapted to receive packages of liquid food products and a cover member adapted to sealingly engage the open end of the body,
means for supplying a fluid heating medium into the autoclave to heat food products contained therein to a predetermined temperature,
means for agitating the food products during heating thereof to insure even and thorough heating thereof, and
means for supplying a pressurized gaseous cooling medium at a temperature below 32° F. to quickly cool the products at the conclusion of the required heating.

2. An apparatus for processing liquid food products packaged in sealed containers to impart improved non-refrigerated storage life without excessive loss of flavor, the apparatus comprising:
a rotatable autoclave including an elongate hollow body supported for rotation about an axis extending longitudinally thereof and open at one end and adapted to receive packages of liquid food products, and a cover member adapted to sealingly engage the open end of the body,
means for supplying a fluid heating medium into the autoclave to heat food products contained therein to a predetermined temperature,
means for rotating the autoclave to agitate the food products to insure even and thorough heating thereof, and
means for supplying a pressurized gaseous cooling medium at a temperature below 32° F. to quickly cool the products at the conclusion of the required heating.

3. An apparatus for processing liquid food products packaged in sealed containers to impart improved non-refrigerated storage life without excessive loss of flavor, the apparatus comprising:
a rotatable autoclave including an elongate hollow body supported for rotation about a horizontal axis extending longitudinally thereof and open at one end and adapted to receive packages of liquid food products, and a cover member adapted to sealingly engage the open end of the body,
means actuable independently of said cover member for securing packages of products against relative movement within the autoclave during rotation thereof,
means for admitting a fluid heating medium into the autoclave to heat food products secured therein to a predetermined temperature,
means for rotating the autoclave to agitate the food products to insure even and thorough heating thereof,
means for venting the autoclave, and
means for supplying a pressurized fluid cooling medium at a temperature below 32° F. to quickly cool the products at the conclusion of the required heating.

4. An apparatus as claimed in claim 3 in which the first named means comprises:
a plurality of clamping members mounted within the autoclave, and
means for causing coordinated movement of the clamping members for simultaneously clamping the top and side surfaces of packages of products within the autoclave.

5. An apparatus for processing liquid food products packaged in sealed containers to impart improved non-refrigerated storage life without excessive loss of flavor, the apparatus comprising:
a rotatable autoclave including a hollow body supported for rotation and open at one end and adapted to receive packages of liquid food products, and a cover member adapted to sealingly engage the open end of the body,
a top clamping member mounted within the autoclave for vertical movement,
a pair of side clamping members mounted within the autoclave and at least one of the side clamping members being mounted for lateral movement,
means for moving the top clamping member downwardly to clamp the top surface of a package of liquid food products placed in the autoclave,
means interconnecting the top clamping member and the at least one side clamping member for moving the latter laterally inwardly as the former moves downwardly to clamp the side surfaces of a package of liquid food products,
means for admitting a fluid heating medium into the autoclave to heat food products secured therein to a predetermined temperature,
means for rotating the autoclave to agitate the food products to insure even and thorough heating thereof,
means for venting the autoclave, and
means for admitting a fluid cooling medium at a temperature below 32° F. to quickly cool the products at the conclusion of the required heating.

6. An apparatus as claimed in claim 5 in which said interconnecting means comprises:
means carried by said hollow body and being connected to said at least one side clamping member for mounting said at least side clamping member on said hollow body for lateral movement relative thereto, said means having a cam surface thereon, and
means carried by said top clamping member for vertical movement therewith and engageable with said cam surface for moving said at least one side clamping member laterally inwardly as said top clamping member moves vertically downwardly.

7. An apparatus for processing liquid food products packaged in sealed containers to impart improved non-refrigerated storage life without excessive loss of flavor, the apparatus comprising:
a rotatable autoclave including a hollow body supported for rotation and open at one end and adapted to receive packages of liquid food products, and a cover member adapted to sealingly engage the open end of the body,
a top clamping member mounted within the autoclave for vertical movement,
a pair of side clamping members,
means for moving the top clamping member downwardly to clamp the top surface of a package of liquid food products placed in the autoclave,
means mounted within said hollow body of the autoclave and connected to the side clamping members for mounting the side clamping members for lateral movement toward and away from each other, said mounting means having cam surfaces thereon,
means carried by the top clamping member for vertical movement therewith and engaging said cam surfaces for moving the side clamping members laterally inwardly as the top clamping member moves vertically downwardly,
means for admitting a fluid heating medium into the autoclave to heat food products secured therein to a predetermined temperature,
means for rotating the autoclave to agitate the food products to insure even and thorough heating thereof,
means for venting the autoclave, and
means for admitting a fluid cooling medium at a temperature below 32° F. to quickly cool the products at the conclusion of the required heating.

8. An autoclave for use in processing liquid food products packaged in sealed containers to impart improved non-refrigerated storage life comprising:
   a hollow body supported for rotation and open at one end and adapted to receive packages of liquid food products,
   a cover member adapted to sealingly engage the open end of the body,
   a top clamping member mounted within the autoclave for vertical movement,
   a pair of side clamping members mounted within the autoclave and at least one of the side clamping members being mounted for lateral movement,
   means for moving the top clamping member downwardly to clamp the top surface of a package of liquid food products placed in the autoclave, and
   means interconnecting the top clamping member and the at least one side clamping member for moving the side clamping member laterally inwardly as the top clamping member moves downwardly to clamp the side surfaces of a package of liquid food products.

9. An autoclave as claimed in claim 8 in which said interconnecting means comprises:
   means carried by said hollow body and being connected to said at least one side clamping member for mounting said at least one side clamping member on said hollow body for lateral movement relative thereto, said means having a cam surface thereon, and
   means carried by said top clamping member for vertical movement therewith and engageable with said cam surface for moving said at least one side clamping member laterally inwardly as said top clamping member moves vertically downwardly.

10. An autoclave for use in processing liquid food products packaged in sealed containers to impart improved non-refrigerated storage life comprising:
    a hollow body supported for rotation and open at one end and adapted to receive packages of liquid food products,
    a cover member adapted to sealingly engage the open end of the body,
    a pair of side clamping members,
    means for moving the top clamping member downwardly to clamp the top surface of a package of liquid food products placed in the autoclave,
    means mounted within said hollow body of the autoclave and connected to the side clamping members for mounting the side clamping members for lateral movement toward and away from each other, said mounting means having cam surfaces thereon,
    means carried by the top clamping member for vertical movement therewith and engaging said cam surfaces for moving the side clamping members laterally inwardly as the top clamping member moves vertically downwardly.

11. An autoclave for use in processing liquid food products in sealed containers to impart improved non-refrigerated storage life comprising:
    a hollow body supported for rotation and having an open end and adapted to receive packages of products,
    a cover member carried by the body and having an interrupted flange and adapted to sealingly engage the open end of the body,
    a locking member mounted for rotational movement about the axis of the body and having a plurality of roller elements adapted to engage the interrupted flange and hold the cover member in sealing engagement on rotation of the locking member,
    a plurality of clamping members mounted within the autoclave, and
    means for causing coordinated movement of the clamping members for simultaneously clamping the top and side surfaces of packages of products within the autoclave.

12. An autoclave as claimed in claim 11 further comprising:
    the interrupted flange having segments with tapered surfaces which together define an interrupted thread, and
    the roller elements being adapted to engage the tapered surfaces to draw said cover member into engagement with said body on rotation of said locking member.

13. An autoclave for use in processing liquid food products in sealed containers to impart improved non-refrigerated storage life comprising:
    a hollow body supported for rotation and having an open end and adapted to receive packages of products,
    a cover member carried by the body and adapted to sealingly engage the open end of the body and having an interrupted flange formed with segments with tapered surfaces which together define an interrupted thread,
    a locking ring member mounted on the body for rotational movement about the body and having a plurality of roller elements adapted to engage the tapered surfaces and draw the cover member into sealing engagement with the body on rotation of the ring member,
    means responsive to a predetermined pressure condition within the sealed body for positively engaging the ring member and preventing rotation of that member while that pressure condition continues,
    a plurality of clamping members mounted within the autoclave, and
    means for causing coordinated movement of the clamping members for simultaneously clamping the top and side surfaces of packages of products within the autoclave.

14. An autoclave for use in procesing liquid food products in sealed containers to impart improved non-refrigerated storage life comprising:
    a hollow body supported for rotation and having an open end and adapted to receive packages of products,
    a cover member carried by the body and adapted to sealingly engage the open end of the body and having an interrupted flange formed with segments with tapered surfaces which together define an interrupted thread,
    a locking ring member mounted on the body for rotational movement about the body and having a plurality of roller elements adapted to engage the tapered surfaces and draw the cover member into sealing engagement with the body on rotation of the ring member,
    safety vent means communicating with the interior of the body and operatively associated with the locking ring member for venting the autoclave on rotation of the locking ring member from a cover member sealed position to a cover member released position,
    a plurality of clamping members mounted within the autoclave, and
    means for causing coordinated movement of the clamping members for simultaneously clamping the top and side surfaces of packages of products within the autoclave.

References Cited

UNITED STATES PATENTS

| | | | |
|---|---|---|---|
| 1,174,189 | 3/1916 | Smith | 99—36.9 |
| 1,518,552 | 12/1924 | Babendreer | 99—371 |

ROBERT W. JENKINS, Primary Examiner

U.S. Cl. X.R.

99—214, 216, 359